(12) United States Patent
Zatsepin

(10) Patent No.: US 12,314,661 B2
(45) Date of Patent: May 27, 2025

(54) NATURAL LANGUAGE DETECTION

(71) Applicant: ABBYY Development Inc., Dover, DE (US)

(72) Inventor: Michael Zatsepin, Novokuznetsk (RU)

(73) Assignee: ABBYY Development Inc., Dover, DE (US)

( * ) Notice: Subject to any disclaimer, the term of this patent is extended or adjusted under 35 U.S.C. 154(b) by 348 days.

(21) Appl. No.: 18/082,919

(22) Filed: Dec. 16, 2022

(65) Prior Publication Data

US 2024/0202444 A1    Jun. 20, 2024

(51) Int. Cl.
*G06F 40/284* (2020.01)
*G06F 40/263* (2020.01)
*G06V 30/148* (2022.01)

(52) U.S. Cl.
CPC .......... *G06F 40/284* (2020.01); *G06F 40/263* (2020.01); *G06V 30/153* (2022.01)

(58) Field of Classification Search
CPC ... G06F 40/284; G06F 40/263; G06V 30/153; G06V 30/10
USPC ............................................................ 704/9
See application file for complete search history.

(56) References Cited

U.S. PATENT DOCUMENTS

| | | |
|---|---|---|
| 8,224,642 B2 | 7/2012 | Goswami |
| 8,635,061 B2 | 1/2014 | Li |
| 8,938,384 B2 | 1/2015 | Goswami |
| 9,330,086 B2 | 5/2016 | Zhao |
| 10,460,192 B2 | 10/2019 | Gopalakrishnan |

FOREIGN PATENT DOCUMENTS

| | | |
|---|---|---|
| RU | 2500024 C2 | 11/2013 |
| WO | 2021161095 A1 | 8/2021 |

OTHER PUBLICATIONS

Lui, Marco et al, Department of Computing and Information Systems, The University of Melbourne, "Automatic Detection and Language Identification of Multilingual Documents", 2014, 14 pages.
Jauhiainen, Tommi et al, Journal of Artificial Intelligence Research, "Automatic Language Identification in Texts: A Survey", arXiv:1804. 08186v2 [cs.CL] Nov. 21, 2018, 103 pages.
Barlas, P et al., HAL open science, "Language Identification in Document Images", HAL Id: hal-01282930 https://hal.archives-ouvertes.fr/hal-01282930, Submitted on Mar. 8, 2016, 15 pages.

*Primary Examiner* — Thierry L Pham
(74) *Attorney, Agent, or Firm* — Lowenstein Sandler LLP

(57) ABSTRACT

An example method of language detection includes: identifying a document comprising a plurality of words in one or more natural languages; for each word of at least a subset of words of the document: generating a plurality of sets of tokens representing the word, wherein each set of tokens of the plurality of sets of tokens represents the word using a corresponding plurality of tokens defined for a corresponding natural language of a set of natural languages, and identifying, based on the plurality of sets of tokens, a primary natural language associated with the word; associating each natural language of the set of natural languages with a corresponding word count indicating a number of words of the subset of words for which the natural language has been identified as the primary natural language; identifying, among the set of natural languages, a natural language associated with a maximum word count; and associating the identified natural language with the document.

20 Claims, 10 Drawing Sheets featured            Primary Language: English, no alternative languages

| | | |
|---|---|---|
| English | -12.23 | featured |
| Turkish | -21.71 | featur + ed |
| Slovak | -22.42 | featur + ed |
| German | -22.98 | featur + ed |
| Italian | -23.41 | featur + ed |
| Finnish | -24.50 | featur + ed |
| Latvian | -26.00 | featur + ed |
| Romanian | -28.04 | feat + ured |
| Croatian | -28.29 | feat + u + red |
| Estonian | -28.29 | feat + ur + ed |
| Portuguese | -28.40 | feat + ured |
| Norwegian | -29.47 | feat + ured |
| Dutch | -29.74 | feat + ured |
| Danish | -29.92 | feat + ured |
| Slovenian | -30.22 | feat + u + red |
| Hungarian | -30.32 | feat + ur + ed |
| Polish | -30.69 | feat + ure + d |
| Swedish | -31.56 | feat + u + red |
| Lithuanian | -32.16 | feat + ur + ed |
| French | -32.43 | fea + tu + red |
| Czech | -32.74 | feat + ure + d |
| Spanish | -37.33 | fe + atu + red | assistants         Primary Language: French, alternative language: English

| | | |
|---|---|---|
| French | -14.39 | assistants |
| English | -14.69 | assistants |
| Dutch | -24.22 | assist + ants |
| Portuguese | -24.41 | assist + ants |
| Estonian | -24.65 | assist + ants |
| Norwegian | -24.84 | assist + ants |
| Italian | -24.85 | assist + ants |
| Danish | -25.56 | assist + ants |
| Finnish | -26.95 | assist + ants |
| Romanian | -28.62 | assist + ants |
| Turkish | -28.63 | assist + ants |
| Latvian | -32.22 | as + sist + ants |
| Spanish | -32.54 | ass + ist + ants |
| German | -32.79 | assi + stan + ts |
| Czech | -33.36 | ass + ist + ants |
| Swedish | -33.42 | assi + stan + ts |
| Slovak | -33.96 | ass + ist + ants |
| Croatian | -34.97 | ass + ist + ants |
| Slovenian | -35.02 | ass + ist + ants |
| Hungarian | -35.22 | ass + ist + ants |
| Polish | -37.56 | as + sist + ants |
| Lithuanian | -37.60 | as + sist + ants |

FIG. 7

NATURAL LANGUAGE DETECTION

TECHNICAL FIELD

The implementations of the disclosure relate generally to computer systems and, more specifically, to systems and methods for natural language detection.

BACKGROUND

Language detection is a foundational operation in various natural language processing tasks, such as information extraction or machine translation. Language detection may involve identifying one or more natural languages in which the content of an analyzed document is expressed.

SUMMARY OF THE DISCLOSURE

In accordance with one or more aspects of the present disclosure, an example method of language detection includes: identifying a document comprising a plurality of words in one or more natural languages; for each word of at least a subset of words of the document: generating a plurality of sets of tokens representing the word, wherein each set of tokens of the plurality of sets of tokens represents the word using a corresponding plurality of tokens defined for a corresponding natural language of a set of natural languages, and identifying, based on the plurality of sets of tokens, a primary natural language associated with the word; associating each natural language of the set of natural languages with a corresponding word count indicating a number of words of the subset of words for which the natural language has been identified as the primary natural language; identifying, among the set of natural languages, a natural language associated with a maximum word count; and associating the identified natural language with the document.

In accordance with one or more aspects of the present disclosure, an example system for language detection comprises a memory and a processor coupled to the memory, the processor configured to: identify a document comprising a plurality of words in one or more natural languages; for each word of at least a subset of words of the document: generate a plurality of sets of tokens representing the word, wherein each set of tokens of the plurality of sets of tokens represents the word using a corresponding plurality of tokens defined for a corresponding natural language of a set of natural languages, and identify, based on the plurality of sets of tokens, a primary natural language associated with the word; associate each natural language of the set of natural languages with a corresponding word count indicating a number of words of the subset of words for which the natural language has been identified as the primary natural language; identify, among the set of natural languages, a natural language associated with a maximum word count; and associate the identified natural language with the document.

In accordance with one or more aspects of the present disclosure, an example computer-readable non-transitory storage medium comprises executable instructions that, when executed by a processing device, cause the processing device to: identify a document comprising a plurality of words in one or more natural languages; for each word of at least a subset of words of the document: generate a plurality of sets of tokens representing the word, wherein each set of tokens of the plurality of sets of tokens represents the word using a corresponding plurality of tokens defined for a corresponding natural language of a set of natural languages, and identify, based on the plurality of sets of tokens, a primary natural language associated with the word; associate each natural language of the set of natural languages with a corresponding word count indicating a number of words of the subset of words for which the natural language has been identified as the primary natural language; identify, among the set of natural languages, a natural language associated with a maximum word count; and associate the identified natural language with the document.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 7 illustrates examples of generating token sequences, in accordance with aspects of the present disclosure.

DETAILED DESCRIPTION

Figure 1:
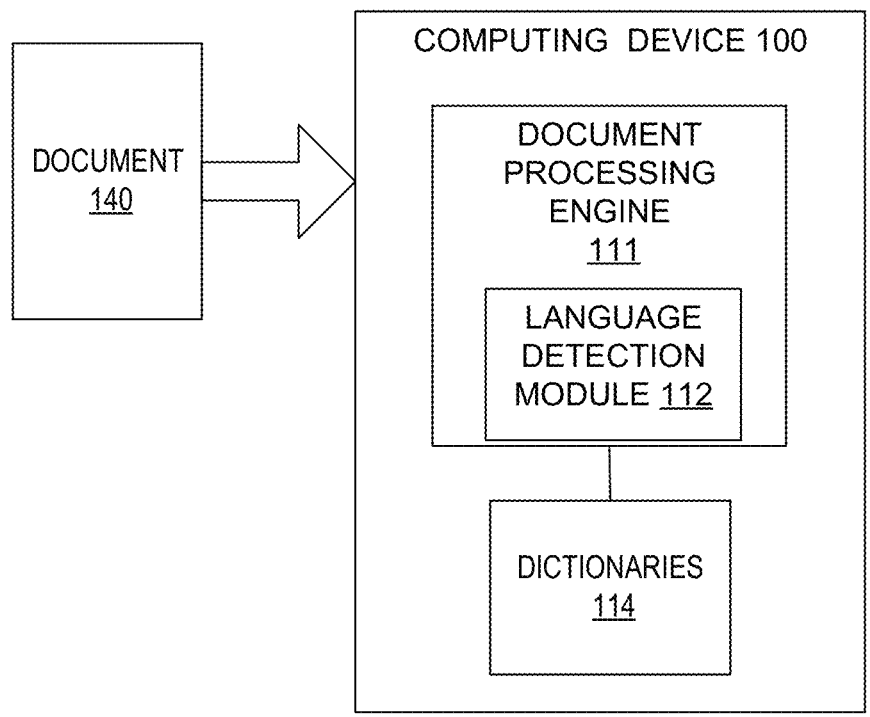
FIG. 1 is a block diagram of an example computing device, which may implement the methods described herein.

Systems and methods for language detection are described. Various conventional approaches may perform poorly for certain types of documents, including multi-language documents.

Aspects of the disclosure address the above noted and other deficiencies by providing systems and methods for natural language detection. An original document may be printed, typed, or handwritten (for example, by filling out a standard form). A document may have a variety of fields, such as text fields (containing numerals, numbers, letters, words, sentences), graphics field (containing a logo or any other image), tables (having rows, columns, cells), and so on.

Accordingly, "electronic document" (or "document") may refer to any indicia-bearing medium, an image if which is accessible to a computing system that performs various natural language processing tasks. The image may be a scanned image, a photographed image, or any other representation of a document that is being capable of being converted into a digital form accessible to the computing system.

Example of document include invoices, business cards, identification documents, banking documents, contracts, invoices, loan applications, orders, bills of lading, accounting documents, reporting documents, and/or other documents, including those created by filling in predefined fields with alphanumeric characters.

For simplicity and conciseness of description, examples of the present disclosure operate on a single-page documents, while considering multiple-page documents as sets of single-page documents, which can be processed separately (e.g., sequentially or in parallel).

Various documents may be created by application software, such as word processing programs, electronic mail programs, web page authoring tools, etc. Electronic documents may also be created by scanning paper documents and processing the images using optical character recognition (OCR) or other methods to create an electronic representation of the document content. In various implementations, a document may conform to any suitable electronic file format, such as PDF, DOC, ODT, JPEG, etc.

The techniques described herein involve two-stage processing, in which the first stage detects the language of each word of a chosen subset of words of an input document, while the second stage detects the language(s) of the document as a whole.

In some implementations, the input to the language detection system can be a document image, which can be split into multiple non-overlapping portions (image fragments) and transformed into respective textual representations by applying OCR methods. At the ensuing pre-processing stage, a subset of words that meets certain criteria (e.g., are the most informative from the point of view of belonging to a particular language) is selected from all fragments. For further analysis, a certain subset of all fragments is selected (e.g., randomly). The proportion of the selected fragments may depend, e.g., on the type of the input document.

The resulting subset fragments is then purged of fragments that were recognized with an error rate exceeding a certain threshold and/or of fragments that contain alphanumeric identifiers, which may not be informative for language detection.

Furthermore, at the preprocessing stage, punctuation prefixes and/or punctuation suffixes may be cut off and punctuation marks may be removed from the textual representations. The resulting words are utilized for two-stage language detection: word level language detection and document level language detection.

When defining document languages at the word level, the probability of each word belonging to each language of a chosen (e.g., user-defined) set of languages is determined. This may involve generating, using a pre-built token dictionary for a specified language (e.g., a byte pair encoding (BPE) dictionary), a sequence of token representing a word. The probability of the word belonging to the specified language is then estimated based on the frequencies of the resulting tokens. Then, for each word, the maximum probability among all language probabilities is selected, and the corresponding language is identified as the primary language for the word; one or more alternative languages having lower probabilities may also be chosen for the word.

The second stage involves language detection at the document level. Accordingly, the language associated with the maximum number of words as the primary language is identified and appended to the list of languages associated with the document. Then, the list of words of the document is purged of all words associated with that language (as the primary or alternative language).

Subsequently, the language associated as the primary language with the maximum number of remaining words is identified and appended to the list of languages associated with the document. The list of words of the document is purged again of all words associated with that language (as the primary or alternative language).

This process may be repeated until: (a) the number of words associated with at least one language reaches a certain high threshold (i.e., almost all words produced by the pre-processing stage are covered) and/or (b) the number of words for which the next language is identified as the primary or alternative is less than a certain low threshold (i.e., the next language covers very few words). The result of the system operation are all languages that have been associated with the document.

Thus, the systems and methods of the present disclosure reliably and efficiently detect one or more natural languages of a document being analyzed.

FIG. 1 is a block diagram of an example computing device 100 which may implement the methods described herein. In various implementations, the computing device 100 may be a desktop computer, a laptop computer, a smartphone, a tablet computer, a server, a scanner, or any suitable computing device capable of performing the techniques described herein. In some implementations, the computing device 100 can include one or more computing devices 1000 of FIG. 10.

A document 140 may be received by the computing device 100. The document 140 may include any suitable text(s), image(s), or table(s), including one or more characters (e.g., letters and/or numbers), words, sentences, etc. The document 140 may be of any type, such as "business card," "invoice," "passport," "medical policy," "questionnaire," etc. In some implementations, the type of the document 140 may be specified by a user and communicated to the computing device 100 together with the document 140; alternatively, the type of the document 140 may be automatically determined by the document processing engine 111 implemented by the computing device 100.

In some implementations, the computing device 100 may receive an image of the document 140 by scanning or photographing the document. Alternatively, the computing device 100 may receive an image of the document 140 via an input/output (I/O) interface, such as a network interface.

The computing device 100 may implement a document processing engine 111, which may include one or more software modules including executable instructions stored on one or more tangible, machine-readable storage media of the computing device 100 and executable by one or more processors of the computing device 100.

The document processing engine 111 may use perform various natural language processing tasks, such as information extraction, document classification, and/or natural language translation. In some implementations, the document processing engine 111 may include a language detection module 112, which may include one or more software modules including executable instructions stored on one or more tangible, machine-readable storage media of the computing device 100 and executable by one or more processors of the computing device 100. The language detection module 112 may implement the language detection methods described herein. In some implementations, the language detection module may utilize one or more dictionaries 114, which may at least partially be stored in a local volatile and/or non-volatile memory of the computing device 100.

Figure 2:
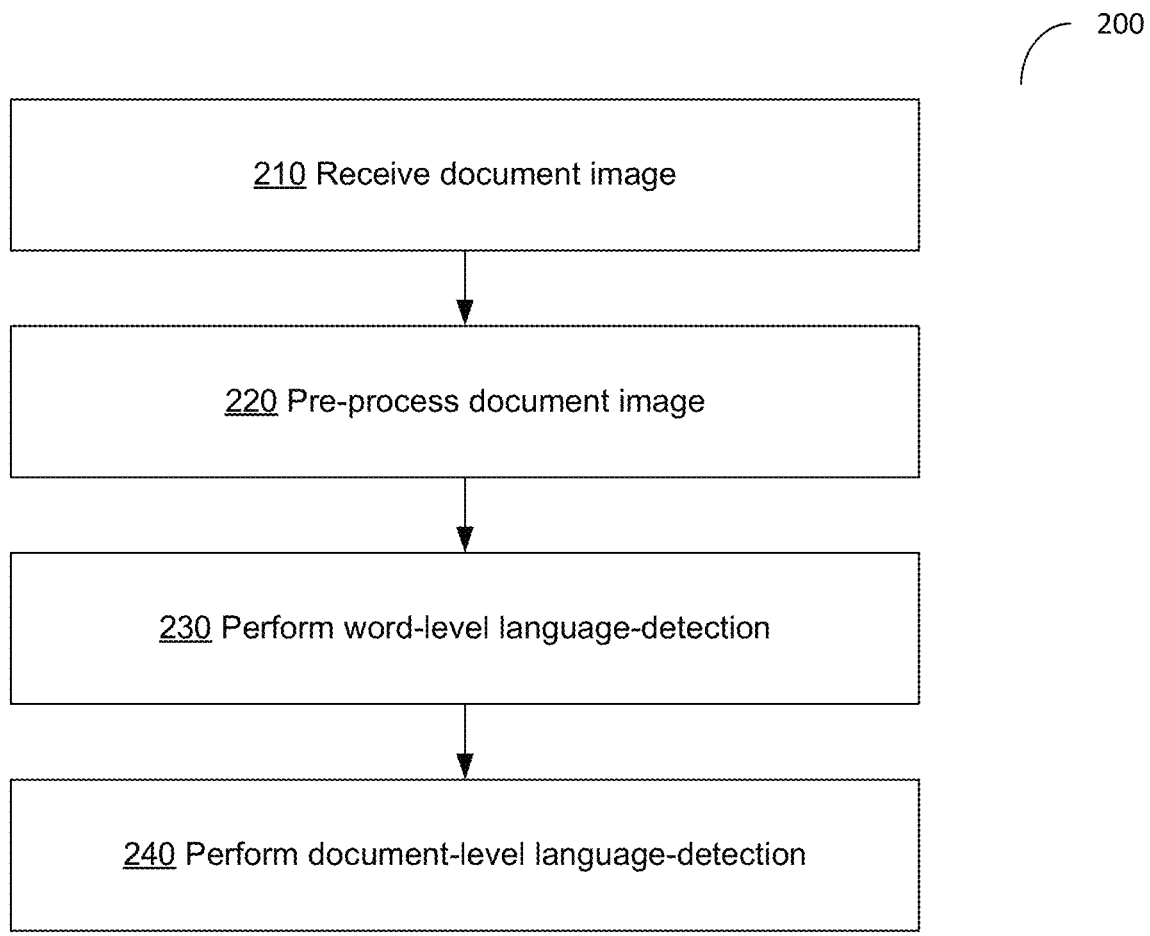
FIG. 2 is a flowchart of an example method of natural language detection, in accordance with aspects of the present disclosure.

FIG. 2 is a flowchart of an example method 200 of natural language detection, in accordance with aspects of the present disclosure. The method 200 may be performed by processing logic that may comprise hardware (e.g., circuitry, dedicated logic, programmable logic, microcode, etc.), software, firmware, or a combination thereof. In some implementations, the method 200 may be performed by one or more computing devices (e.g., the computer system 1000 of FIG. 10). In some implementations, the method 200 may be performed by a single processing thread. Alternatively, the method 200 may be performed by two or more processing threads, each thread executing one or more individual functions, routines, subroutines, or operations of the method. In an illustrative example, the processing threads implementing the method 200 may be synchronized (e.g., using semaphores, critical sections, and/or other thread synchronization mechanisms). Alternatively, the processing threads implementing the method 200 may be executed asynchronously with respect to each other. Therefore, while FIG. 2 and the associated description list the operations of the method 200 in certain order, various implementations of the methods may perform at least some of the described operations in parallel and/or in arbitrary selected orders.

At operation 210, the computing device implementing the method receives a document image. As noted herein above, examples of the present disclosure operate on a single-page documents, while considering multiple-page documents as sets of single-page documents, which can be processed separately (e.g., sequentially or in parallel).

At operation 220, the document image is pre-processed, as described in more detail herein below with reference to FIG. 3. The resulting set of portions of the document image (document image fragments) and corresponding extracted words are fed to the operation 230.

At operation 230, the word level language detection is performed, which may involve determining the probability of each word of at least a subset of words of the document belonging to each language of a chosen set of languages. For each word, the maximum probability among all language probabilities is selected, and the corresponding language is identified as the primary language for the word; one or more alternative languages having lower probabilities may also be chosen for the word, as described in more detail herein below.

At operation 240, the document level language detection is performed, which may involve identifying one or more languages associated with the largest numbers of words as the primary language, as described in more detail herein below.

Figure 3:
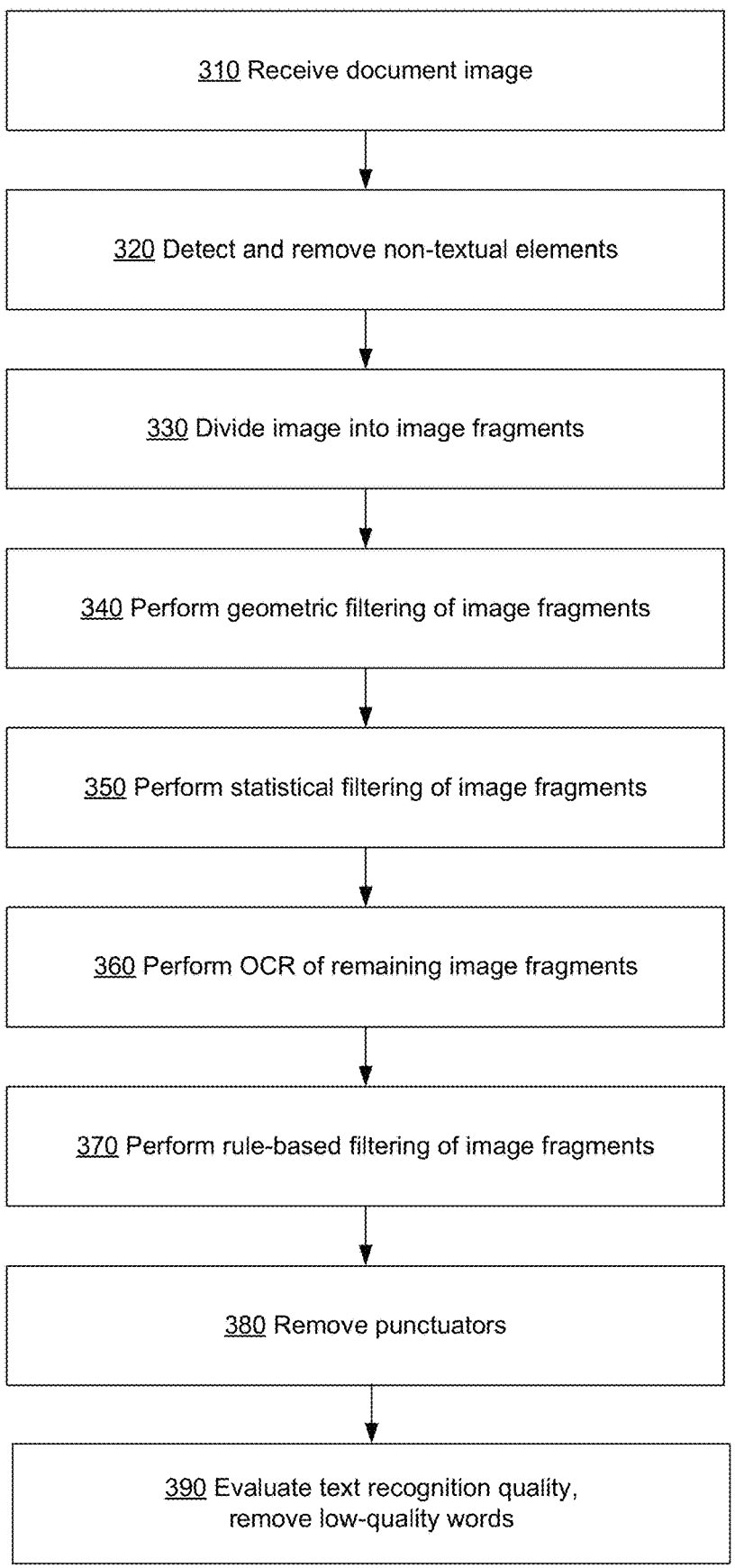
FIG. 3 is a flowchart of an example method of pre-processing the input document image, in accordance with aspects of the present disclosure.

FIG. 3 is a flowchart of an example method 300 of pre-processing the input document image, in accordance with aspects of the present disclosure. The method 300 may be performed by processing logic that may comprise hardware (e.g., circuitry, dedicated logic, programmable logic, microcode, etc.), software, firmware, or a combination thereof. In some implementations, the method 300 may be performed by one or more computing devices (e.g., the computer system 1000 of FIG. 10). In some implementations, the method 300 may be performed by a single processing thread. Alternatively, the method 300 may be performed by two or more processing threads, each thread executing one or more individual functions, routines, subroutines, or operations of the method. In an illustrative example, the processing threads implementing the method 300 may be synchronized (e.g., using semaphores, critical sections, and/or other thread synchronization mechanisms). Alternatively, the processing threads implementing the method 300 may be executed asynchronously with respect to each other. Therefore, while FIG. 3 and the associated description list the operations of the method 300 in certain order, various implementations of the methods may perform at least some of the described operations in parallel and/or in arbitrary selected orders.

At operation 310, the computing device implementing the method receives a document image. As noted herein above, examples of the present disclosure operate on a single-page documents, while considering multiple-page documents as sets of single-page documents, which can be processed separately (e.g., sequentially or in parallel).

At operation 320, the computing device detects and removes, from the document image, certain non-textual elements (seals, stamps, drawings, photographs, etc.) that are not relevant for further analysis.

At operation 330, the computing device divides the document image into multiple non-overlapping portions (image fragments), e.g., having a rectangular form.

Figure 4:
FIG. 4 illustrates an example of randomly selected fragments of the input image that are filtered based on the ratio of the width and the height of the fragment, in accordance with aspects of the present disclosure.

At operation 340, the computing device performs geometric filtering of the image fragments. In some implementations, the blocks having the ratio of their length to width falling below a certain threshold, may be excluded from further consideration as each such a block would likely contain a single character or a short word, which may be uninformative from the point of view of belonging to a particular language. FIG. 4 illustrates an example of randomly selected fragments of the input image 400 that are filtered based on the ratio of the width and the height of the fragment.

Referring again to FIG. 3, at operation 350, the computing device performs statistical filtering of the image fragments, by selecting (e.g., randomly) a subset of the remaining image fragments. The proportion of selected and unselected image fragments may depend upon the type of the input document—e.g., for invoices and bills, the proportion would be greater than for documents that contain larger portions of unstructured or weakly-structured text.

At operation 360, the computing device performs OCR of the remaining image fragments, thus producing corresponding character sequences (text fragments).

At operation 370, the computing device performs further filtering of image fragments based on the filtering rules defining quality of text recognition. Thus, image fragments containing less than a predetermined number of characters, image fragments containing alphanumeric identifiers (e.g., model numbers, serial numbers, etc.), and/or various other image fragments that failed to produce a recognizable sequence of characters are excluded from further analysis.

At operation 380, the computing device removes, from each word of the resulting set, punctuation prefixes, punctuation suffixes, and punctuation marks. In some implementations, the words are further converted to the lower case.

At operation 390, the computing device evaluates the text recognition quality by a classifier utilizing token-based dictionaries (e.g., BPE dictionaries) for a set of languages that are supported for detection. BPE encoding iteratively replaces the most frequent pair of bytes in an input sequence with a single, unused byte. Special symbols can be used for end-of-word and/or start-of-word in order to facilitate the process of reconstructing the input sequence based on the translation result. All symbol pairs are traversed iteratively to replace each occurrence of the most frequent pair with a corresponding new symbol; thus, each translation operation produces a new symbol which represents a character n-gram (n>=2). The most frequent pair can be derived from a corresponding frequency dictionary. In some implementations, the BPE dictionary for each language can include at least a predefined number of entries.

Figure 5:
FIG. 5 illustrates an example image with marked-up recognized words, in accordance with aspects of the present disclosure.

In some implementations, the computing device may, using a classifier based on the pre-built BPE dictionaries, identify the words that have been recognized with low accuracy and remove such words from the resulting set, as schematically illustrated by an example image 500 of FIG. 5. The classifier may use, e.g., the gradient boosting model. The resulting set of image fragments and corresponding extracted words may then be fed to the word-level language detector implementing the method 600 of FIG. 6.

Figure 6:
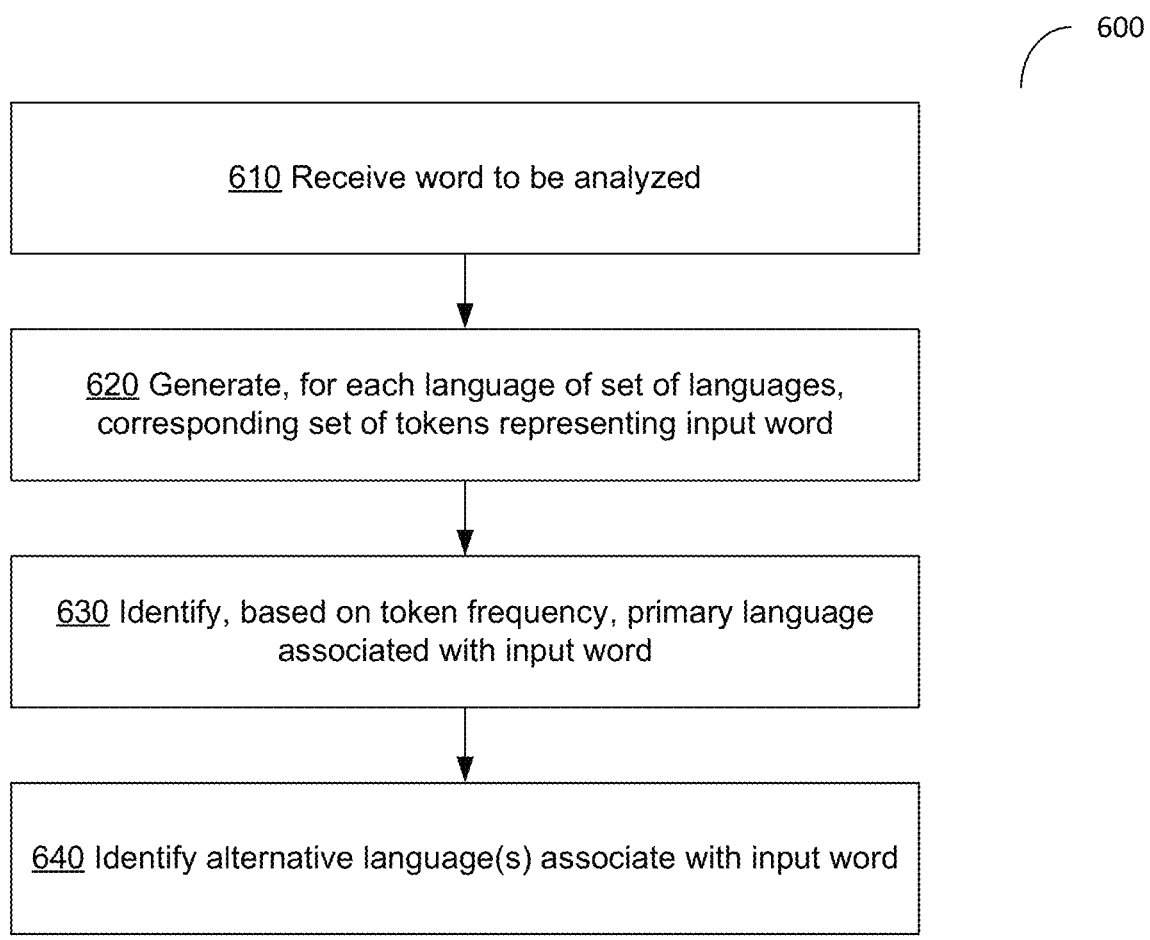
FIG. 6 is a flowchart of an example method of word-level language detection, in accordance with aspects of the present disclosure.

FIG. 6 is a flowchart of an example method 600 of word-level language detection, in accordance with aspects of the present disclosure. The method 600 is performed for each word of a chosen subset of words of the document that is being analyzed. The method 600 may be performed by processing logic that may comprise hardware (e.g., circuitry, dedicated logic, programmable logic, microcode, etc.), software, firmware, or a combination thereof. In some implementations, the method 600 may be performed by one or more computing devices (e.g., the computer system 1000 of FIG. 10). In some implementations, the method 600 may be performed by a single processing thread. Alternatively, the method 600 may be performed by two or more processing threads, each thread executing one or more individual functions, routines, subroutines, or operations of the method. In an illustrative example, the processing threads implementing the method 600 may be synchronized (e.g., using semaphores, critical sections, and/or other thread synchronization mechanisms). Alternatively, the processing threads implementing the method 600 may be executed asynchronously with respect to each other. Therefore, while FIG. 6 and the associated description list the operations of the method 600 in certain order, various implementations of the methods may perform at least some of the described operations in parallel and/or in arbitrary selected orders.

At operation 610, the computing device receives a word to be analyzed.

At operation 620, the computing device implementing the method generates, for each language of the set of languages that are supported for detection, a corresponding set of tokens representing the word that is being analyzed. In an illustrative examples, the word can be translated into a set of tokens using the BPE dictionary for the corresponding language.

At operation 630, the computing device identifies the primary natural language to be associated with the word, based on the frequencies of the tokens that form representations of the word in each of the languages. In some implementations, the primary language corresponds to the set of tokens that has the minimum, among all sets of tokens generated for that word at operation 620, number of tokens.

At operation 640, the computing device identifies one or more alternative natural languages to be associated with the word, based on the frequencies of the tokens that form representations of the word in each of the languages. The alternative languages need to be considered since some words may be present simultaneously in several languages. In some implementations, an alternative language representation of the word may have the same or similar number of tokens to the number of tokens in the representation of the word corresponding to the identified primary language.

FIG. 7 illustrates an example 700 of generating token sequences for each of the two example words, "featured" and "assistants," in accordance with aspects of the present disclosure. In FIG. 7, the first column shows the list of languages that were considered, the third column shows the sequence of tokens generated for the word for the language identified by the first column, and the second column shows the values of the metric reflecting the probability of the word being associated with the language identified by the first column. In the illustrative example of FIG. 7, the metric is represented by the sum of the logarithms of the frequencies of the tokens that form the word representation in the corresponding language.

Figure 8:
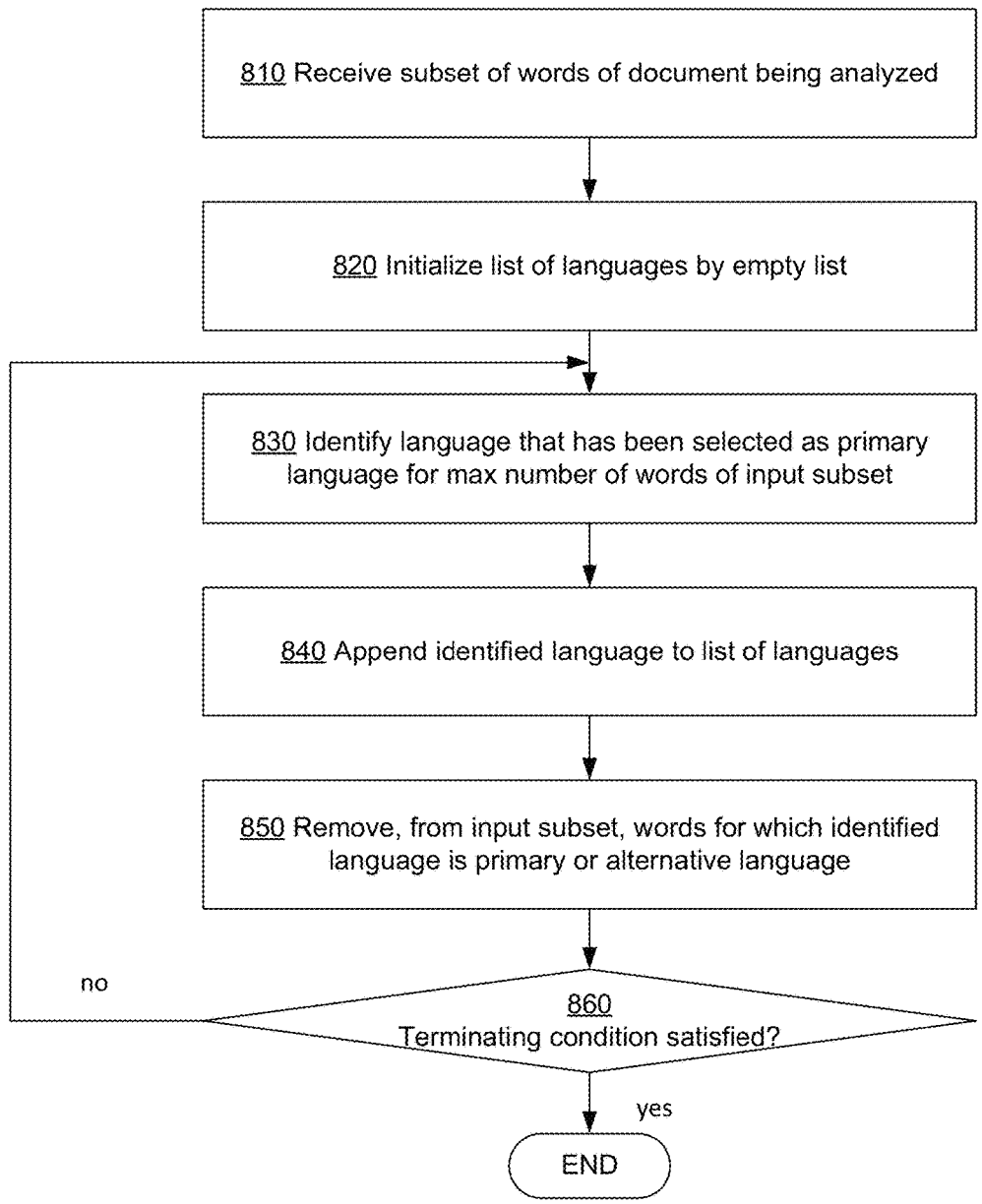
FIG. 8 is a flowchart of an example method of document-level language detection, in accordance with aspects of the present disclosure.

The word-level languages determined by the method 600 may then be fed to the document-level language detector implementing the method 800 of FIG. 8.

FIG. 8 is a flowchart of an example method 800 of document-level language detection, in accordance with aspects of the present disclosure. The method 800 is performed for each word of a chosen subset of words of the document that is being analyzed. The method 800 may be performed by processing logic that may comprise hardware (e.g., circuitry, dedicated logic, programmable logic, microcode, etc.), software, firmware, or a combination thereof. In some implementations, the method 800 may be performed by one or more computing devices (e.g., the computer system 1000 of FIG. 10). In some implementations, the method 800 may be performed by a single processing thread. Alternatively, the method 800 may be performed by two or more processing threads, each thread executing one or more individual functions, routines, subroutines, or operations of the method. In an illustrative example, the processing threads implementing the method 800 may be synchronized (e.g., using semaphores, critical sections, and/or other thread synchronization mechanisms). Alternatively, the processing threads implementing the method 800 may be executed asynchronously with respect to each other. Therefore, while FIG. 8 and the associated description list the operations of the method 800 in certain order, various implementations of the methods may perform at least some of the described operations in parallel and/or in arbitrary selected orders.

At operation 810, the computing device implementing the method receives at least a subset of words of the document being analyzed; each word is accompanied by identifications of the primary and alternative identified languages that have been identified by the word-level language detector (e.g., using method 600 of FIG. 6).

At operation 820, the computing device initializes, by an empty list, the list of languages associated with the document being analyzed.

At operation 830, the computing device identifies the language that has been selected as the primary language for the maximum number of words of the subset of words of the document being analyzed. This can be done, for example, by sorting in descending order, for each language, the number of words for which this language has been identified as the primary language.

At operation 840, the identified language is appended to the list of languages associated with the document being analyzed.

At operation 850, the words for which the identified language has been identified as the primary or an alternative language are removed from the subset of words of the document being analyzed.

Responsive to determining, at operation 860, that the terminating condition has not yet been satisfied, the processing loops back to 830; otherwise, the method terminates.

In some implementations, the terminating condition may be based on the number of words that have not been associated, as with either primary or alternative language, with the language identified at any iteration of operation 830. Should the number of such words fall below a predefined portion of the initial number of words received at operation 810 (in other words, almost all words have been associated with the language identified at operation 830), the terminating condition is satisfied.

Alternatively, the terminating condition may be based on the number of words that have been associated, as with either primary or alternative language, with the language identified at the last iteration of operation 830. Should the number of such words fall below a predefined portion of the initial number of words received at operation 810 (in other words, the language identified at the last iteration of operation 830 covers a small number of words), the terminating condition is satisfied.

In some implementations, the terminating conditions may be based on the combination of both above-described criteria.

If the chosen terminating condition is satisfied, the method terminates, and the list of languages identifies the languages detected in the document.

Figure 9:
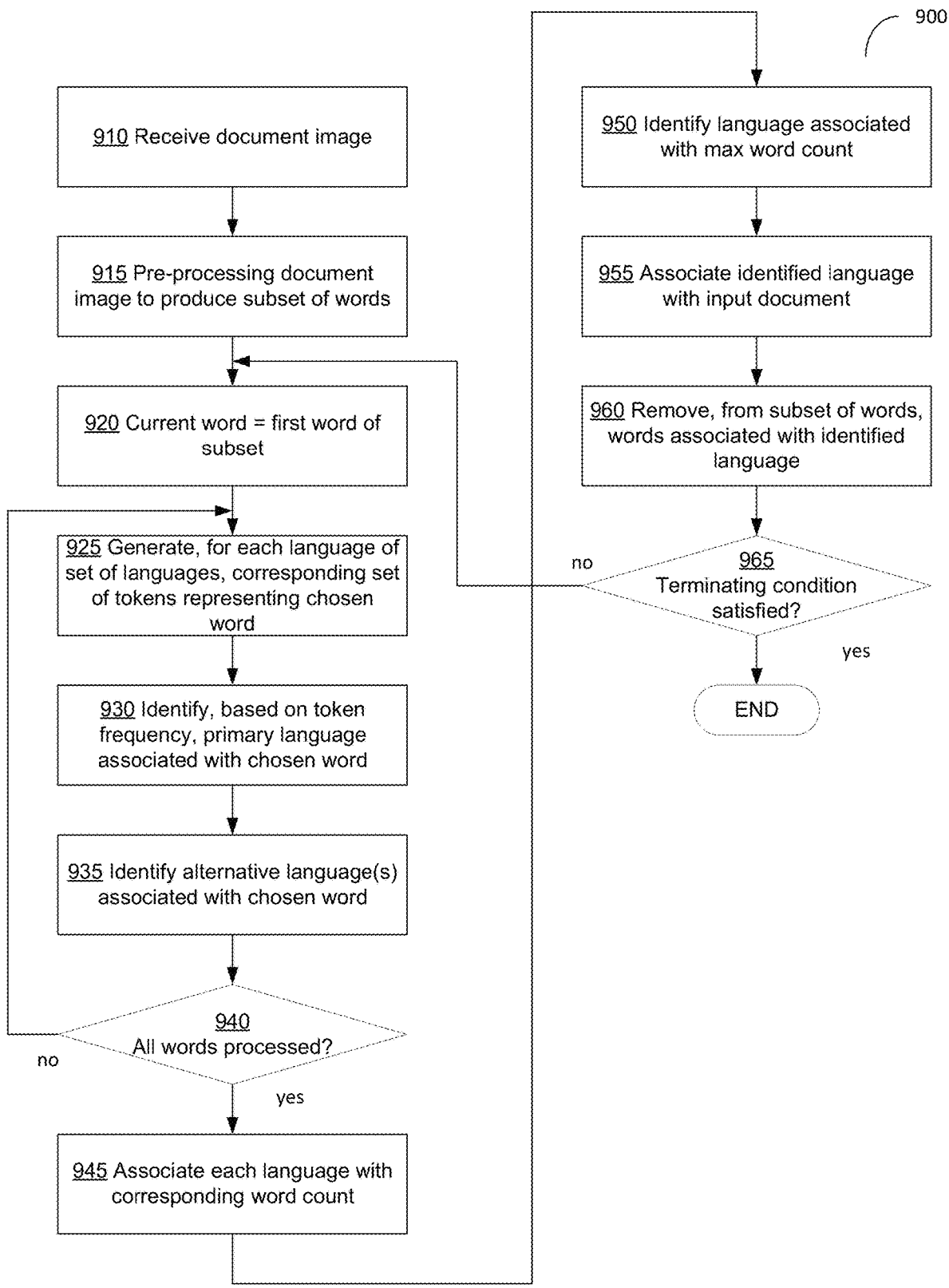
FIG. 9 is a flowchart of an example method of language detection, in accordance with aspects of the present disclosure.

FIG. 9 is a flowchart of an example method 900 of language detection, in accordance with aspects of the present disclosure. The method 900 is performed for each word of a chosen subset of words of the document that is being analyzed. The method 900 may be performed by processing logic that may comprise hardware (e.g., circuitry, dedicated logic, programmable logic, microcode, etc.), software, firmware, or a combination thereof. In some implementations, the method 900 may be performed by one or more computing devices (e.g., the computer system 1000 of FIG. 10). In some implementations, the method 900 may be performed by a single processing thread. Alternatively, the method 900 may be performed by two or more processing threads, each thread executing one or more individual functions, routines, subroutines, or operations of the method. In an illustrative example, the processing threads implementing the method 900 may be synchronized (e.g., using semaphores, critical sections, and/or other thread synchronization mechanisms). Alternatively, the processing threads implementing the method 900 may be executed asynchronously with respect to each other. Therefore, while FIG. 9 and the associated description list the operations of the method 900 in certain order, various implementations of the methods may perform at least some of the described operations in parallel and/or in arbitrary selected orders.

At operation 910, the computing device implementing the method receives a document image. As noted herein above, examples of the present disclosure operate on a single-page documents, while considering multiple-page documents as sets of single-page documents, which can be processed separately (e.g., sequentially or in parallel).

At operation 915, the document image is pre-processed, as described in more detail herein above with reference to FIG. 3. The resulting set of portions of the document image (document image fragments) and corresponding extracted words are fed to the operation 920.

At operation 920, the first word of the subset is identified for processing.

At operation 925, the computing device implementing the method generates, for each language of the set of languages that are supported for detection, a corresponding set of tokens representing the word that is being analyzed. In an illustrative examples, the word can be translated into a set of tokens using the BPE dictionary for the corresponding language.

At operation 930, the computing device identifies the primary natural language to be associated with the word, based on the frequencies of the tokens that form representations of the word in each of the languages. In some implementations, the primary language corresponds to the set of tokens that has the minimum, among all sets of tokens generated for that word at operation 925, number of tokens.

At operation 935, the computing device identifies one or more alternative natural languages to be associated with the word, based on the frequencies of the tokens that form representations of the word in each of the languages. The alternative languages need to be considered since some words may be present simultaneously in several languages. In some implementations, an alternative language representation of the word may have the same or similar number of tokens to the number of tokens in the representation of the word corresponding to the identified primary language.

Responsive to determining, at operation 940, that all words of the initial subset of words have been processed, the processing continues at operation 945; otherwise, the next word is selected from the subset and the method loops back to operation 925.

At operation 945, the computing device associates each natural language of the set of natural languages with a corresponding word count indicating the number of words of the subset of words for which the natural language has been identified as the primary natural language.

At operation 950, the computing device identifies, among the set of natural languages, the natural language associated with the maximum word count.

At operation 955, the computing device associates the identified natural language with the document being analyzed.

At operation 960, the words for which the identified language has been identified as the primary or an alternative language are removed from the subset of words of the document being analyzed.

Responsive to determining, at operation 965, that the terminating condition has not yet been satisfied, the processing loops back to 920; otherwise, the method terminates.

In some implementations, the terminating condition may be based on the number of words that have not been associated, as with either primary or alternative language, with the language identified at any iteration of operation 950. Should the number of such words fall below a predefined portion of the initial number of words selected at operation 915 (in other words, almost all words have been associated with the language identified at operation 950), the terminating condition is satisfied.

Alternatively, the terminating condition may be based on the number of words that have been associated, as with either primary or alternative language, with the language identified at the last iteration of operation 950. Should the number of such words fall below a predefined portion of the initial number of words received at operation 915 (in other words, the language identified at the last iteration of operation 950 covers a small number of words), the terminating condition is satisfied.

In some implementations, the terminating conditions may be based on the combination of both above-described criteria.

If the chosen terminating condition is satisfied, the method terminates, and the list of languages identifies the languages detected in the document.

In various illustrative examples, the computing device may, based on the identified natural language, perform various natural language processing task with respect to the document being analyzed, e.g., information extraction or natural language translation.

Figure 10:
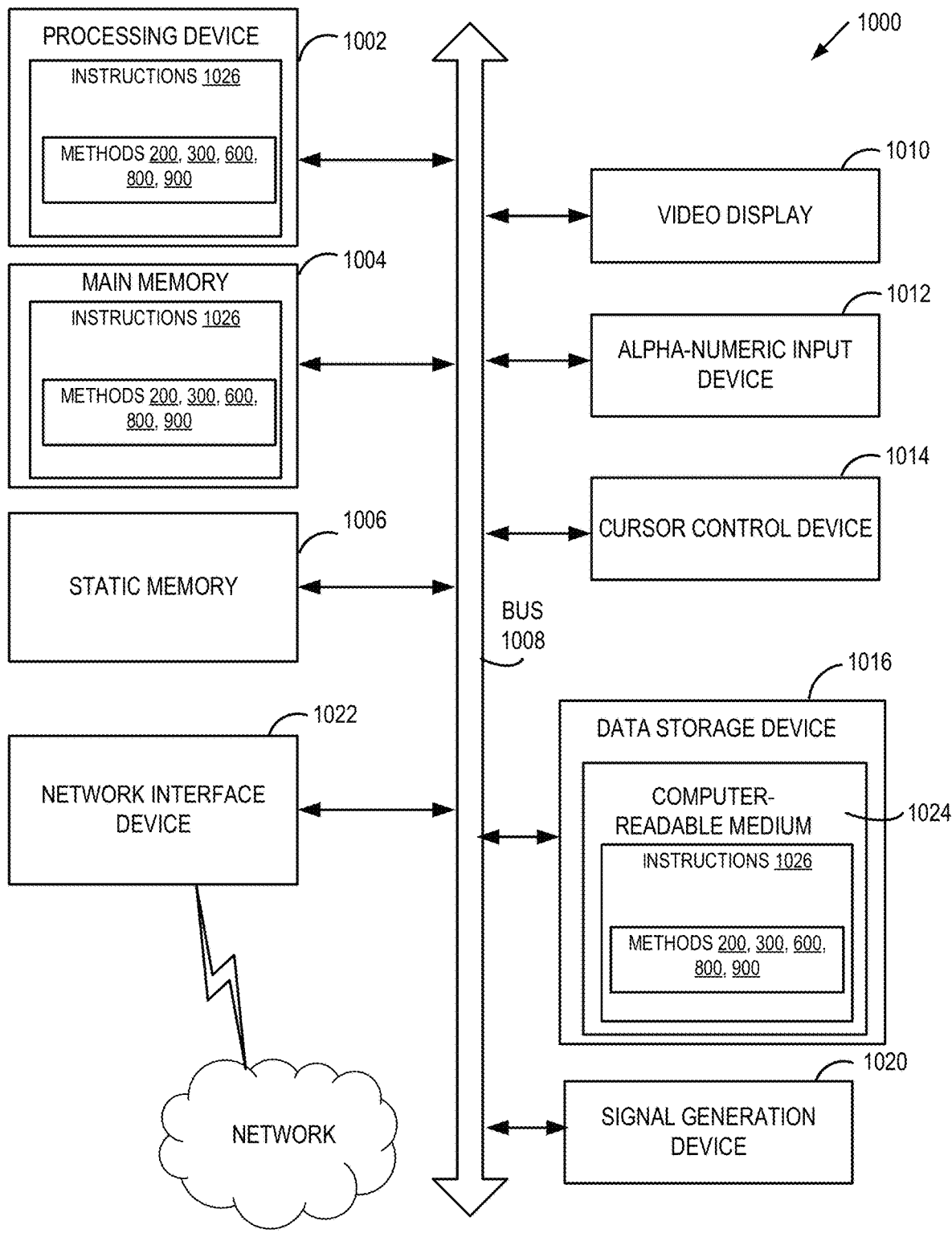
FIG. 10 illustrates a block diagram of a computer system in accordance with some implementations of the present disclosure.

FIG. 10 depicts an example computer system 1000 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for implementing the methods described herein (e.g., method 200 of natural language detection, method 300 of pre-processing the input document image, method 600 of word-level language detection, method 800 of document-level language detection, and/or method 900 of language detection.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker). In one illustrative example, the video display unit 1010, the alphanumeric input device 1012, and the cursor control device 1014 may be combined into a single component or device (e.g., an LCD touch screen).

The data storage device 1016 may include a computer-readable medium 1024 on which is stored the instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting computer-readable media. In some implementations, the instructions 1026 may further be transmitted or received over a network via the network interface device 1022.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In some implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "some implementations" or "an implementation" or "some implementations" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   identifying, by a processing device, a document comprising a plurality of words in one or more natural languages;
   for each word of at least a subset of words of the document:
      generating a plurality of sets of tokens representing the word, wherein each set of tokens of the plurality of sets of tokens represents the word using a corresponding plurality of tokens defined for a corresponding natural language of a set of natural languages, and
      identifying, based on the plurality of sets of tokens, a primary natural language associated with the word;
   associating each natural language of the set of natural languages with a corresponding word count indicating a number of words of the subset of words for which the natural language has been identified as the primary natural language;
   identifying, among the set of natural languages, a natural language associated with a maximum word count; and
   associating the identified natural language with the document.

2. The method of claim 1, further comprising:
   identifying, based on the plurality of sets of tokens, an alternative natural language associated with the word.

3. The method of claim 1, further comprising:
   iteratively performing the operations of:
      updating the subset of words of the document by removing one or more words associated with the identified natural language,
      associating each natural language of the set of natural languages with a corresponding word count indicating a number of words of the updated subset of words for which the natural language has been identified as the primary natural language,
      identifying, among the set of natural languages, a natural language associated with a maximum word count, and
      associating the identified natural language with the document.

4. The method of claim 3, wherein the operations are iteratively performed until a number of words of the document that associated with at least one language reaches a certain high threshold.

5. The method of claim 3, wherein the operations are iteratively performed until a number of words for which a language that has been identified as a primary or alternative language by a current iteration falls below a certain low threshold.

6. The method of claim 1, further comprising:
   performing, based on the identified natural language, a natural language processing task with respect to the document.

7. The method of claim 1, wherein identifying the document further comprises:
   performing optical character recognition (OCR) of an image.

8. The method of claim 1, wherein the subset of words is identified by applying one or more filtering criteria to a plurality of words comprised by the document.

9. The method of claim 1, wherein identifying the document further comprises:
- splitting an input image into a plurality of portions;
- removing one or more portions satisfying one or more geometric criteria;
- performing optical character recognition (OCR) of at least a subset of remaining portions.

10. A system comprising:
- a memory; and
- a processing device operatively coupled to the memory, the processing device configured to:
  - identify a document comprising a plurality of words in one or more natural languages;
  - for each word of at least a subset of words of the document:
    - generate a plurality of sets of tokens representing the word, wherein each set of tokens of the plurality of sets of tokens represents the word using a corresponding plurality of tokens defined for a corresponding natural language of a set of natural languages, and
    - identify, based on the plurality of sets of tokens, a primary natural language associated with the word;
  - associate each natural language of the set of natural languages with a corresponding word count indicating a number of words of the subset of words for which the natural language has been identified as the primary natural language;
  - identify, among the set of natural languages, a natural language associated with a maximum word count; and
  - associate the identified natural language with the document.

11. The system of claim 10, wherein the processing device is further configured to:
- identify, based on the plurality of sets of tokens, an alternative natural language associated with the word.

12. The system of claim 10, wherein the processing device is further configured to:
- iteratively perform the operations of:
  - updating the subset of words of the document by removing one or more words associated with the identified natural language,
  - associating each natural language of the set of natural languages with a corresponding word count indicating a number of words of the updated subset of words for which the natural language has been identified as the primary natural language,
  - identifying, among the set of natural languages, a natural language associated with a maximum word count, and
  - associating the identified natural language with the document.

13. The system of claim 10, wherein the processing device is further configured to:
- perform, based on the identified natural language, a natural language processing task with respect to the document.

14. The system of claim 10, wherein identifying the document further comprises:
- performing optical character recognition (OCR) of an image.

15. The system of claim 10, wherein the subset of words is identified by applying one or more filtering criteria to a plurality of words comprised by the document.

16. The system of claim 10, wherein identifying the document further comprises:
- splitting an input image into a plurality of portions;
- removing one or more portions satisfying one or more geometric criteria;
- performing optical character recognition (OCR) of at least a subset of remaining portions.

17. A non-transitory computer-readable storage medium including executable instructions that, when executed by a processing device, cause the processing device to:
- identify a document comprising a plurality of words in one or more natural languages;
- for each word of at least a subset of words of the document:
  - generate a plurality of sets of tokens representing the word, wherein each set of tokens of the plurality of sets of tokens represents the word using a corresponding plurality of tokens defined for a corresponding natural language of a set of natural languages, and
  - identify, based on the plurality of sets of tokens, a primary natural language associated with the word;
- associate each natural language of the set of natural languages with a corresponding word count indicating a number of words of the subset of words for which the natural language has been identified as the primary natural language;
- identify, among the set of natural languages, a natural language associated with a maximum word count; and
- associate the identified natural language with the document.

18. The non-transitory computer-readable storage medium of claim 17, further comprising executable instructions that, when executed by the processing device, cause the processing device to:
- identify, based on the plurality of sets of tokens, an alternative natural language associated with the word.

19. The non-transitory computer-readable storage medium of claim 17, further comprising executable instructions that, when executed by the processing device, cause the processing device to:
- iteratively perform the operations of:
  - updating the subset of words of the document by removing one or more words associated with the identified natural language,
  - associating each natural language of the set of natural languages with a corresponding word count indicating a number of words of the updated subset of words for which the natural language has been identified as the primary natural language,
  - identifying, among the set of natural languages, a natural language associated with a maximum word count, and
  - associating the identified natural language with the document.

20. The non-transitory computer-readable storage medium of claim 17, further comprising executable instructions that, when executed by the processing device, cause the processing device to:
- perform, based on the identified natural language, a natural language processing task with respect to the document.

* * * * *